United States Patent
Clark (10) Patent No.: US 10,317,891 B2
(45) Date of Patent: Jun. 11, 2019

(54) OPERATOR AND MANUFACTURING QUALITY TRACEABILITY

(71) Applicant: Toyota Motor Engineering & Manufacturing North America, Inc., Erlanger, KY (US)

(72) Inventor: Frederick Joseph Clark, Georgetown, KY (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 365 days.

(21) Appl. No.: 14/949,748

(22) Filed: Nov. 23, 2015

(65) Prior Publication Data

US 2017/0146975 A1    May 25, 2017

(51) Int. Cl.
*G05B 19/41*    (2006.01)
*G05B 19/418*    (2006.01)

(52) U.S. Cl.
CPC ........... *G05B 19/41875* (2013.01); *G05B 2219/32196* (2013.01); *G05B 2219/32368* (2013.01); *Y02P 90/10* (2015.11); *Y02P 90/22* (2015.11); *Y02P 90/26* (2015.11)

(58) Field of Classification Search
None
See application file for complete search history.

(56) References Cited

U.S. PATENT DOCUMENTS

| | | | |
|---|---|---|---|
| 6,522,939 B1* | 2/2003 | Strauch | G05B 19/41875 700/116 |
| 7,221,987 B2* | 5/2007 | Bett | G05B 23/0229 700/108 |
| 7,349,754 B1 | 3/2008 | Palansky et al. | |
| 7,684,886 B2* | 3/2010 | Sullivan | G06F 17/50 700/105 |
| 7,771,089 B2* | 8/2010 | Schultz | F21V 29/004 362/294 |
| 7,848,828 B2* | 12/2010 | Okayasu | G05B 19/4184 257/48 |
| 8,799,113 B2* | 8/2014 | Markham | B23Q 35/12 705/29 |
| 2003/0036939 A1* | 2/2003 | Flores | G06Q 10/06 705/7.16 |
| 2005/0027726 A1 | 2/2005 | Guivarch et al. | |

(Continued)

*Primary Examiner* — Michael Lebentritt
(74) *Attorney, Agent, or Firm* — Christopher G. Darrow; Darrow Mustafa PC (57) ABSTRACT

Operator and quality information can be traced during manufacturing processes. It can be determined whether an operator requesting access to the manufacturing process is authorized. If authorized, the operator can be granted access to the manufacturing process. Quality information including one or more quality checks associated with the operator can be received. It can be determined whether the one or more quality checks pass predetermined quality requirements. If the quality checks pass the predetermined quality requirements, identification information can be generated. The identification information can be used to apply a traceable output on a part associated with the manufacturing process. Traceability reports can be generated that include the operator identification and the quality information and that can be reviewed by external computing systems.

20 Claims, 6 Drawing Sheets

(56) References Cited

U.S. PATENT DOCUMENTS

| | | | |
|---|---|---|---|
| 2005/0125674 A1* | 6/2005 | Nishiki | G07C 9/00031 713/182 |
| 2006/0078109 A1* | 4/2006 | Akashika | G06F 21/602 380/30 |
| 2006/0120616 A1* | 6/2006 | Kita | H04N 1/00204 382/254 |
| 2006/0136461 A1* | 6/2006 | Lee | G06Q 10/00 |
| 2009/0178123 A1* | 7/2009 | Carpenter | G06F 21/6218 726/5 |
| 2009/0206756 A1* | 8/2009 | Schultz | F21S 48/328 315/58 |
| 2010/0299530 A1* | 11/2010 | Bell | G06F 21/32 713/186 |
| 2011/0270432 A1 | 11/2011 | Carpenter et al. | |
| 2012/0158678 A1* | 6/2012 | McGraw | G06Q 30/02 707/694 |
| 2013/0144416 A1 | 6/2013 | Rataul | |
| 2014/0090083 A1* | 3/2014 | Kobayashi | G06F 21/10 726/27 |
| 2014/0121806 A1 | 5/2014 | Shaw | |
| 2014/0149833 A1* | 5/2014 | Sauber | G06F 11/1004 714/807 |
| 2014/0157006 A1* | 6/2014 | Kim | G06F 12/1433 713/193 |
| 2014/0157382 A1* | 6/2014 | Ford | H04L 63/08 726/7 |
| 2016/0148159 A1* | 5/2016 | Coffing | G06Q 10/10 705/301 |
| 2016/0247111 A1* | 8/2016 | Blumenthal | G06Q 10/06395 |
| 2017/0013047 A1* | 1/2017 | Hubbard | H04L 67/20 |
| 2017/0092099 A1* | 3/2017 | Walker | G08B 21/18 |
| 2017/0098221 A1* | 4/2017 | Rai | G06Q 30/018 |
| 2017/0126838 A1* | 5/2017 | Saint Clair | H04L 67/32 |
| 2017/0302677 A1* | 10/2017 | Dani | H04L 63/104 |

\* cited by examiner

| FirstName ▶ | LastName ▶ | Employee ▶ | FullTime ▶ | SecurityLevel ▶ | KeyID ▶ | Active ▶ | ID |
|---|---|---|---|---|---|---|---|
| Jim | A. | 0001968 | ☒ | 5 | 27990E2D401032 | ☒ | 105 |
| Fred | B. | 0001646 | ☒ | 5 | 21092A31801032 | ☒ | 117 |
| Jeff | C. | 0001089 | ☒ | 5 | 273AA133A01032 | ☒ | 108 |
| Stephen | D. | 00003484 | ☒ | 4 | 21392A358O1032 | ☒ | 111 |
| Ronnie | E. | 00005454 | | 4 | 27990E2D401032 | ☒ | 113 |
| Kevin | F. | 00005313 | ☒ | 4 | 273AA133A01032 | ☒ | 115 |

OPERATOR AND MANUFACTURING QUALITY TRACEABILITY

FIELD

The subject matter described herein relates in general to manufacturing processes, and more particularly, to the traceability of operator and manufacturing quality of manufacturing processes.

BACKGROUND

A variety of techniques have been used in an attempt to increase quality and reduce defects in manufacturing processes in several industries. For example, many modern assembly or manufacturing facilities include error proofing (in Japanese, "pokayoke") systems to maintain quality control and/or traceability of assemblies. Pokayoke systems typically include controllers stationed at each station of an assembly line. Such controllers are used to detect whether a process was performed according to predefined standards or thresholds. Such quality systems can reduce defects from passing on to later manufacturing processes. Further, some manufacturing facilities apply labels or barcodes on parts. The barcodes provide information to identify the particular plant, manufacturing line, and/or time of manufacture of the part.

SUMMARY

In one respect, the present disclosure is directed to a method for operator and manufacturing quality traceability for a manufacturing process. The method can include receiving an access request from an access control system to access the manufacturing process, the access request including operator authentication associated with an operator. It can be determined, using a processor, whether the operator authentication is authorized to allow the operator to access the manufacturing process. Responsive to determining that the operator authentication is authorized, the method can further include receiving quality information from a process quality system. The quality information can include inputs from one or more quality checks associated with the operator during the manufacturing process, the one or more quality checks including at least one required check. It can be determined, using a processor, whether the at least one required quality check passes one or more predetermined requirements. The method can further include generating identification information for a part associated with the manufacturing process in response to determining that the at least one required quality check passes the one or more predetermined requirements. The identification information can be sent for application a traceable output on a part associated with the manufacturing process. The method can also include generating a traceability report, the traceability report including the operator authentication and the quality information.

In another respect, the present disclosure is directed to a system for operator and manufacturing quality traceability for a manufacturing process. The system can include an access control system configured to send an access request responsive to receiving a request to access at least a portion of the manufacturing process. The method can further include a process quality system including one or more quality check tools. The process quality system can be configured to send quality information including inputs from the one or more quality check tools. The quality check tools can be associated with one or more operators in the manufacturing process. The system further includes a traceability computing system communicatively linked to the access control system and the process quality system. The traceability computing system can include a processor programmed to initiate executable operations. The executable operations can include receiving an access request from the access control system. The access request can be for an operator attempting to access at least a portion of the manufacturing process. The access request can include an operator authentication associated with the operator. It can be determined whether the operator authentication is authorized to access the manufacturing process based on one or more permission settings. Responsive to determining that the operator authentication is authorized, the operations can include receiving the quality information from the process quality system that is associated with the operator during the manufacturing process. It can be determined whether the received quality information meets a predetermined set of quality requirements. Identification information can be generated for a part associated with the manufacturing process in response to determining that the received quality information meets the predetermined set of quality requirements. The operations can further include sending the identification information to at least one remote computing system in response to generating the identification information. The operations also can include generating a traceability report that can include the operator authentication and the received quality information. The system can further include an identification system communicatively linked to receive the identification information from the traceability computing system. The identification system can be configured to apply a traceable output on a part associated with the manufacturing process. The traceable output can include the identification information. The system can also include a review system communicatively linked and configured to access the generated traceability report.

In yet another respect, the present disclosure is directed to a method for operator and manufacturing quality traceability for a manufacturing process. The method can include receiving permission settings including a list of operator authentications and associated security levels. The method can also include receiving an access request from an access control system, the access request including an operator authentication associated with an operator. Responsive to receiving the access request, it can be determined, with a processor, whether the operator authentication is authorized to access the manufacturing process based on the permission settings. A signal indicative of a no-good condition can be outputted to a pokayoke system. Responsive to determining that the operator associated with the operator authentication is authorized, quality information can be received from a process quality system. The quality information can include the results from one or more quality checks associated with the operator during the manufacturing process. It can be determined, with the processor, whether all required quality checks pass predetermined requirements. Responsive to determining that all required quality checks pass the predetermined requirements, identification information can be generated. The method can include causing a traceable output to be applied to the part associated with the manufacturing process, the traceable output including the identification information. A signal can be outputted indicative of a good condition to the pokayoke system. The method can include generating a traceability report. The traceability report can include the operator authentication and the quality information. The method can also include outputting the traceability report to one or more external computing systems.

DETAILED DESCRIPTION

This detailed description relates to the traceability of operators and quality for manufacturing processes. Access information can be received from one or more access control systems that can identify an operator. It can be determined whether the identified operator has permission to access the manufacturing process, thus providing exclusive access control. Quality information from a process quality system can be received. The quality information can include one or more quality checks associated with an authorized operator. The one or more quality checks can include at least one required quality check. It can be determined whether the at least one required quality check passes one or more predetermined requirements. If the at least one required quality check passes the one or more predetermined requirements, identification information can be generated. The identification information can be include operator identification and/or the quality information. The identification information can be sent to an identification system for application of a traceable output on a part associated with the manufacturing process. Traceability reports can be generated. The traceability reports can any suitable information, such as the operator identification and the quality information. The present detailed description relates to systems, methods and computer program products that incorporate one or more of such features. Such systems, methods, and computer program products can be implemented with flowout prevention systems, such as pokayoke systems.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-7, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Figure 1:
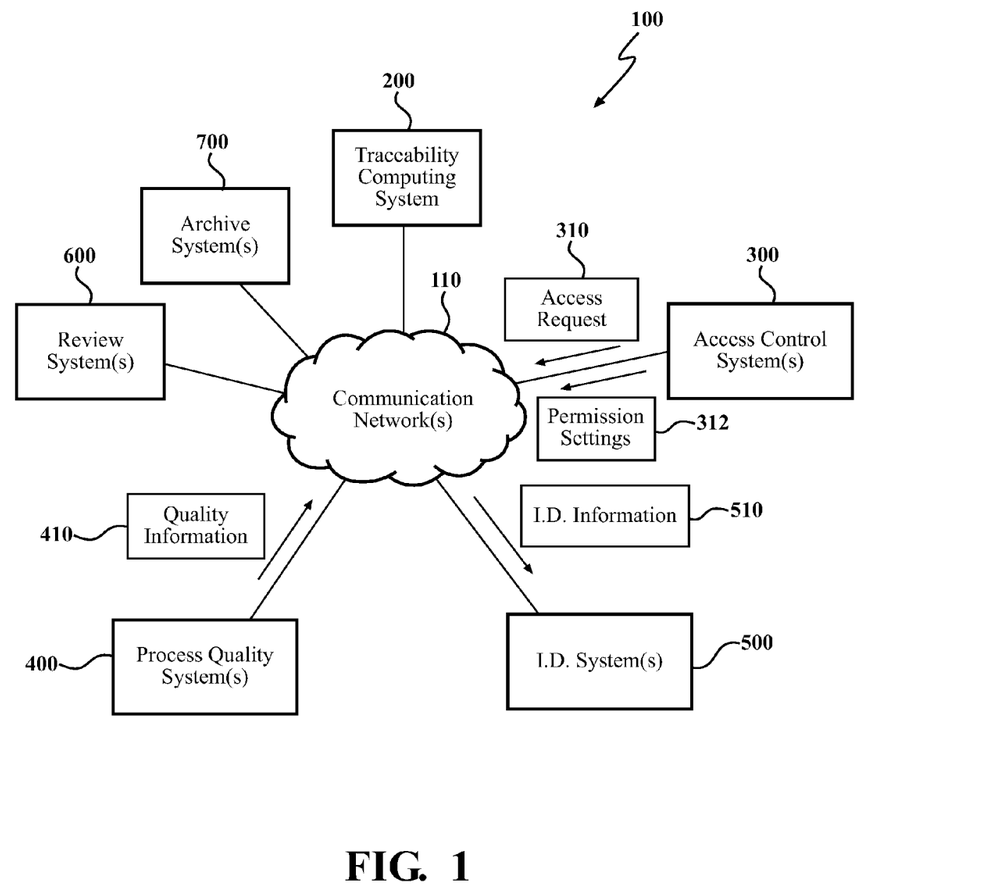
FIG. 1 is an example of a traceability system.

FIG. 1 is an example of a traceability system 100. Some of the possible elements of the traceability system 100 are shown in FIG. 1 and will now be described. However, it will be understood that it is not necessary for the traceability system 100 to have all of the elements shown in FIG. 1 or described herein. The traceability system 100 can include a traceability computing system 200, one or more access control systems 300, one or more process quality systems 400, one or more identification systems 500, one or more review systems 600, and one or more archive systems 700. Each of these elements of the traceability system 100 will be described in greater detail below.

The traceability system 100 can be implemented in connection with one or more manufacturing processes. As used herein, the term "manufacturing process" means any one or more processes that transform one or more parts from one state, form, or condition to another state, form, or condition. As used herein, "part" or "parts" means any materials (e.g., solid, liquid, and/or gas), components, parts, items, assemblies, subassemblies, and/or articles. For instance, the manufacturing processes can include any process(es) in which a part is created, altered, modified, treated, assembled, and/or disassembled. In one or more arrangements, the manufacturing process can result in the formation of a finished part. In one or more arrangements, the manufacturing process can result in the formation an intermediate or unfinished part. The manufacturing process can be an entire process for a part, or it can be a subset of the entire process for a part.

The manufacturing process can be used in connection with any suitable part. For instance, in one or more arrangements, the manufacturing process can include the production and assembly of an automotive component. In one non-limiting example described herein, the manufacturing process can include the assembly of an automotive fuel tank pump. While arrangements described herein will be presented in connection with an industrial production setting, it will be understood that arrangements described herein are not limited to such an application.

The various components of the traceability system 100 can be communicatively linked through one or more communication networks 110. As used herein, the term "communicatively linked" can include direct or indirect connections through a communication channel or pathway or another component or system. A "communication network" means one or more components designed to transmit and/or receive information from one source to another. One or more of the elements of the traceability system 100 can include and/or execute suitable communication software, which enables the various elements to communicate with each other through the communication network 110 and perform the functions disclosed herein.

The one or more communication networks 110 can be implemented as, or include, without limitation, a wide area network (WAN), a local area network (LAN), the Public Switched Telephone Network (PSTN), a wireless network, a mobile network, a Virtual Private Network (VPN), the Internet, and/or one or more intranets. The communication network 110 further can be implemented as or include one or more wireless networks, whether short or long range. For example, in terms of short range wireless networks, the communication network 110 can include a local wireless network built using a Bluetooth or one of the IEEE 802 wireless communication protocols, e.g., 802.11a/b/g/i, 802.15, 802.16, 802.20, Wi-Fi Protected Access (WPA), or WPA2. In terms of long range wireless networks, the communication network 110 can include a mobile, cellular, and or satellite-based wireless network and support voice, video, text, and/or any combination thereof. Examples of long range wireless networks can include GSM, TDMA, CDMA, WCDMA networks or the like. The communication network 110 can include wired communication links and/or wireless communication links. The communication network 110 can include any combination of the above networks and/or other types of networks. The communication network 110 can include one or more routers, switches, access points, wireless access points, and/or the like.

As noted above, the traceability system 100 can include a traceability computing system 200. In one or more arrangements, the traceability computing system 200 can be configured to provide operator access control. In one or more arrangements, the traceability computing system 200 can be configured to provide traceability of operator and manufacturing quality. In one or more arrangements, the traceability computing system 200 can help to detect and prevent defect flowouts, aid in manufacturing and quality control problems investigation, and/or identify accurate and/or narrow ranges of potential defect or suspect manufactured parts and assemblies. The traceability computing system 200 can be configured to send information to and/or receive information from the access control system(s) 300, the process quality system(s) 400, the identification system(s) 500, the review system(s) 600, and/or the archive system(s) 700.

In one or more arrangements, the traceability system 100 can include one or more access control systems 300. The access control system(s) 300 can be configured to control which operators have access to a particular manufacturing process. As used herein, the term "operator" can include any human user that is involved with one or more elements of a manufacturing process. An "operator" can include a user that performs acts during the manufacturing process, including, for example, a manufacturing process and/or a quality check. The terms "operator" can also include a supervisor. A "supervisor" is a user that supervises and/or is otherwise responsible for at least a portion of the manufacturing process. In one or more arrangements, the supervisor does not perform the manufacturing process.

Figure 4:
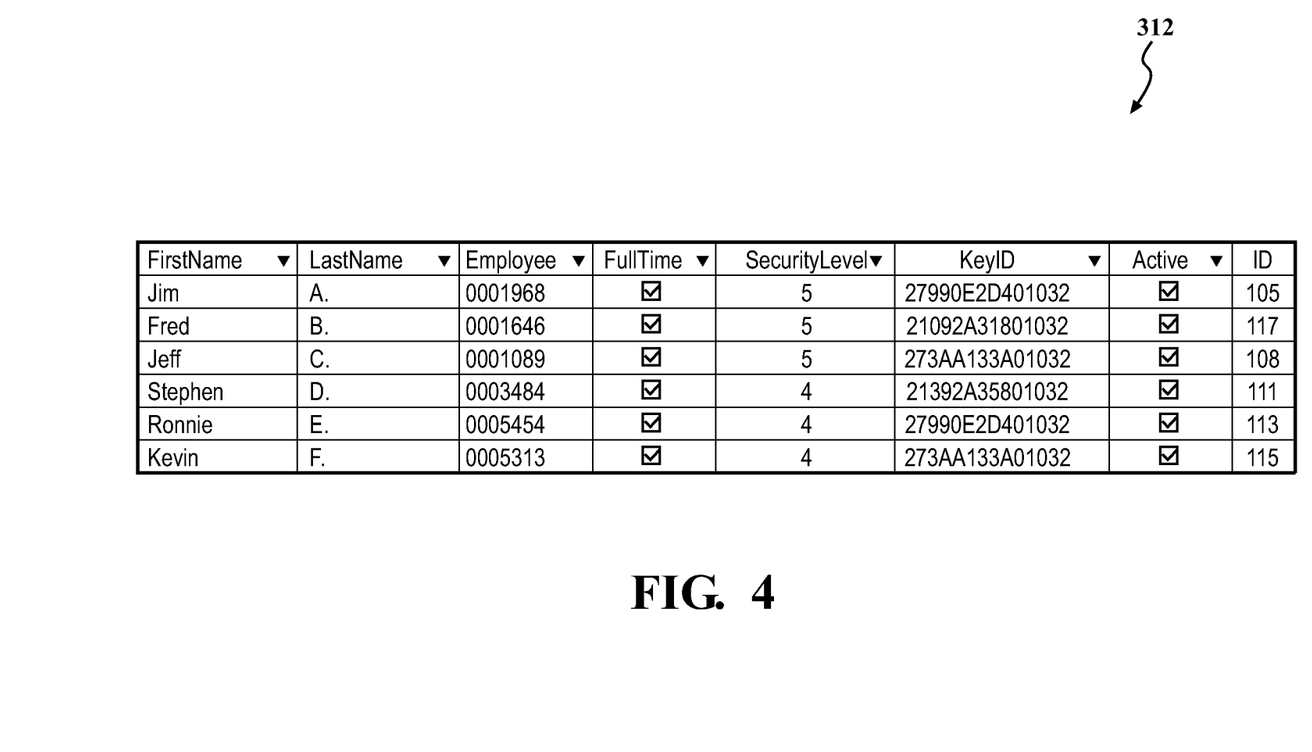
FIG. 4 is an example of a set of permission settings.

In one or more arrangements, the access control system(s) 300 can be configured to provide permission settings 312 to one or more elements of the traceability system 100. As used herein, "permission settings" can include any information relating to the authorization of one or more operators to perform a particular manufacturing process or step. For example, FIG. 4 shows an example of a list of permission settings 312. The permission settings 312 can be for a single operator, or the permission settings 312 can be for a plurality of different operators. In one or more arrangements, the permission settings 312 can include various information associated with an operator. For instance, the permission settings 312 can include a first name, a last name, an employee number, full time status, a security level, and/or a Key ID for each associated operator. In some instances, an operator must have a required security level to access a manufacturing process or a portion thereof. In one or more arrangements, the security level included in the permission settings 312 can allow for access to different systems. For instance, a "supervisor" security level can allow an operator to bypass quality checks and/or pokayoke systems. In some arrangements, a "reviewer" security level can allow an operator to access one or more generated reports.

In one or more arrangements, the access control system(s) 300 can be configured to provide an access request 310 to one or more elements of the traceability system 100. As used herein, "access request" can include any indication that a particular operator desires access to a manufacturing process or a portion thereof (e.g., a particular station of the manufacturing process). The access request 310 can include an operator authentication. "Operator authentication" can include any unique identifier that is associated with a particular operator. In one or more arrangements, each operator and/or supervisor of a manufacturing process can be assigned an electronic key. The electronic key can have operator authentication for a particular operator and/or supervisor stored thereon. For example, an electronic key assigned to an operator can include operator identification in the form of a "Key ID." The electronic key can be presented to a key reader, scanner, or other access control device of the access control system(s) 300. The access control system(s) 300 can generate an access request 310 responsive to detecting, reading, authenticating, and/or otherwise being presented the electronic key.

The access control system(s) 300 can be implemented in any suitable manner. For example, the access control system(s) can include any computing or communication device, such as a telephone (e.g., a smart phone), a computer (e.g., a laptop, a tablet, a phablet, etc.), an electronic key reader, and/or any other portable or fixed computing device. The access control system(s) 300 can be local and/or remote from the traceability computing system 200. Alternatively or in addition, one or more portions of the access control system(s) 300 can be integrated with the traceability computing system 200. For example, the permission settings 312 can be stored within the traceability computing system 200. In one or more arrangements, at least a portion of the access control system(s) 300 can be cloud-based, which can include remote computing services and/or remote server(s). The access control system(s) 300 can be configured to communicate via a wired or wireless medium, such as through communication network 110. In some arrangements, the access request 310 can be sent through the communication network(s) 110 to one or more elements of the traceability system 100, such as, for example, the traceability computing system 200.

Figure 3:
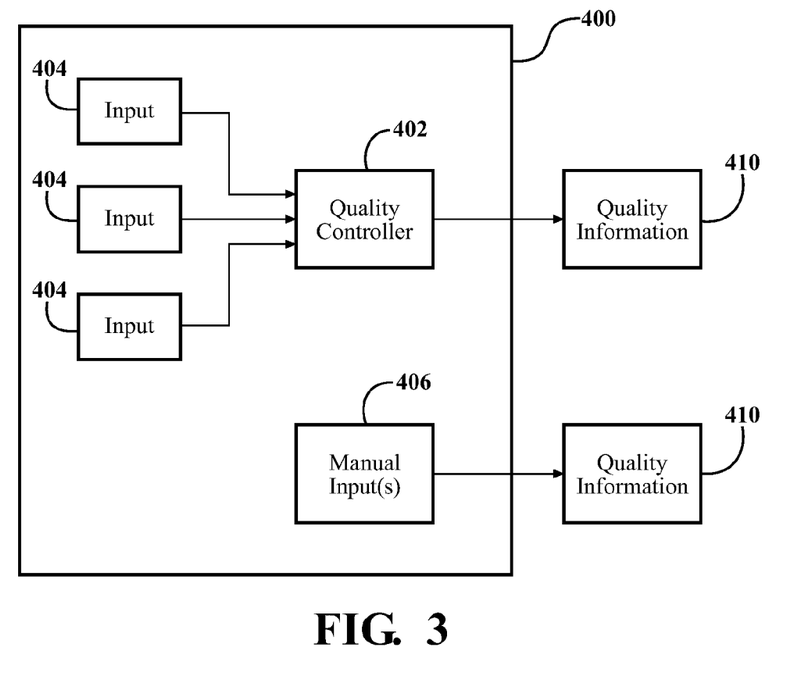
FIG. 3 is an example of a process quality system.

As noted above, the traceability system 100 can include one or more process quality systems 400. The process quality system(s) 400 can be configured to allow the traceability system 100 to access the quality information associated with and/or acquired during at least a part of the manufacturing process. A non-limiting example of the process quality system 400 is shown in FIG. 3. Some of the possible elements of the process quality system 400 will now be described. It will be understood that it is not necessary for the process quality system 400 to have all of the elements shown in FIG. 3 or described herein. The process quality system 400 can have any combination of the various elements shown in FIG. 3. Further, the process quality system 400 can have additional elements to those shown in FIG. 3. In some arrangements, the process quality system 400 may not include one or more of the elements shown in FIG. 3. The various elements of the process quality system 400 can be operatively connected to each other in any suitable manner. The term "operatively connected," as used throughout this description, can include direct or indirect connections, including connections without direct physical contact. Further, the elements shown may be physically separated by large distances.

In one or more arrangements, the process quality system 400 can include one or more quality controllers 402. The one or more quality controllers 402 can be configured to receive one or more inputs from any suitable source. For instance, the one or more quality controllers 402 can be configured to receive one or more tool inputs 404 from one or more quality check tools. In one or more arrangements, the quality controller 402 can include a programmable logic controller (PLC) in communication with one or more quality check tools. The tool inputs 404 can include information generated, collected, and/or acquired by a quality check tool. In one or more arrangements, the tool inputs 404 can be generated by quality check tools that are fastening tools. For example, the quality check tools can include a torque wrench, a screw driver, and/or a welding device. One or more quality check tools can be configured to send one or more tool inputs 404. In one or more arrangements, the quality check tools can be configured to automatically send the tool inputs 404. In one or more arrangements, the quality check tools can be configured to send the tool inputs 404 in response to a user input or command.

Further, the tool inputs 404 can be provided by quality check tools that monitor or test certain features, aspects, processes, steps, functions, parts, outcomes, and/or actions of the manufacturing process. For instance, a leak test, a vision test, a laser scan, a strength test, and/or an electronic test can provide the tool inputs 404. Further, the quality controller 402 can be configured to determine if the one or more tool inputs 404 pass or fail a predetermined quality threshold. For example, the quality controller 402 can determine if the value of the tool input 404 is within an acceptable range. Alternatively or in addition, the quality controller 402 can be configured to send raw data from the tool inputs 404 to other elements of the traceability system 100.

In one or more arrangements, the process quality system(s) 400 can include one or more manual inputs 406. The manual input(s) 406 can be in any suitable format. The manual input(s) 406 can be entered and/or received from an operator directly and/or indirectly. For example, the manual input 406 can be the result of a manual inspection during the manufacturing process, such as a manual visual inspection. The manual input 406 can also include one or more custom comments. For example, an operator can input a comment regarding features, aspects, processes, steps, functions, parts, outcomes, and/or actions of the manufacturing process. In some one or more arrangements, the custom comment can be in response to an operator bypassing a quality check. For instance, a quality check tool normally used for a particular quality check may be malfunctioning, out of calibration, or under maintenance. The manual input 406 can be received by the quality controller 402 and/or by one or more other elements within the traceability system 100. For example, an operator can input a comment to the quality controller(s) 402 and/or the traceability computing system 200.

In one or more arrangements, the process quality system 400 can be configured to send quality information 410 to one or more elements within the traceability system 100. For instance, the process quality system 400 can send the quality information 410 to the traceability computing system 200. As used herein, "quality information" can include any information relating to and/or resulting from a quality check, test, review, assessment, examination, and/or inspection performed during a manufacturing process. For example, quality information can include the tool input(s) 404 and/or the manual input(s) 406.

The process quality system 400 can be configured to analyze the tool inputs 404 and/or the manual inputs 406. For instance, the process quality system 400 can be configured to provide any suitable analysis of the tool inputs 404 and/or the manual inputs 406 before the quality information 410 is sent. For example, the process quality system 400 can determine if the tool inputs 404 and/or the manual inputs 406 are within acceptable or unacceptable ranges, either collectively or individually. In one or more arrangements, the process quality system 400 can perform any suitable statistical, qualitative, quantitative, and/or comparative analysis of the tool inputs 404 and/or the manual inputs 406. The quality information 410 can indicate whether or not the tool inputs 404 and/or the manual inputs 406 are acceptable. Alternatively or in addition, the process quality system 400 can send the raw information from the tool inputs 404 and/or the manual inputs 406 directly without analysis of the raw information.

Referring back to FIG. 1, the traceability system 100 can include one or more identification systems 500. The one or more identification systems 500 can be configured to apply traceable outputs to one or more parts involved in the manufacturing process and/or cause traceable outputs to be applied to one or more parts involved in the manufacturing process. As used herein, "cause" or "causing" means to make, force, compel, direct, command, instruct, and/or enable an event or action to occur or at least be in a state where such event or action may occur, either in a direct or indirect manner. In one or more arrangements, the identification system(s) 500 can be configured to receive identification information 510 from the traceability computing system 200. The identification information 510 can include any relevant information to identify a part associated with the manufacturing process. The "part associated with the manufacturing process" is a part that is being actually being transformed in the manufacturing process. In one or more arrangements, the identification information 510 can include a manufacturing plant or process of origin, a manufacturing sequence, a manufacturing shift, a manufacturing date, a manufacturing time, a party or assembly type (e.g., a particular car model), quality information 410 and/or an operator authentication.

In one or more arrangements, the identification system(s) 500 can be configured to apply a traceable output directly to the part associated with the manufacturing process or to cause a traceable output to be directly applied to the part associated with the manufacturing process. For example, the identification system(s) 500 can print a barcode or QR code on the part or assembly, or it can cause a barcode or QR code to be printed or otherwise formed on the part or assembly. The barcode can be configured to include a portion of or all of the identification information 510. In other non-limiting examples, the identification system(s) 500 can apply or can cause to be applied any other suitable traceable output, such as an RFID tag coding, a QR code, a paint mark, an engraving, and/or a laser etching, just to name a few possibilities. The traceable output can include any coding and/or alpha-numeric text that can represent a portion of or all of the identification information 510.

In one or more arrangements, the traceability system 100 can include one or more review systems 600. The review system(s) 600 can be configured to allow access to information and reports generated by the traceability computing system 200. The review system(s) 600 can include any suitable system configured to enable viewing, downloading, or otherwise accessing information generated by the traceability computing system 200. For example, the review system(s) 600 can include any computing or communication device, such as a telephone (e.g., a smart phone), a computer (e.g., a laptop, a tablet, a phablet, etc.), and/or any other portable or fixed computing device. The review system(s) 600 can be local and/or remote from the traceability computing system 200. In one or more arrangements, the review system(s) 600 can be cloud-based. The review system(s) 600 can be configured to communicate via a wired or wireless medium, such as through communication network 110.

In one or more arrangements, the traceability system 100 can include one or more archive systems 700 to record data received by traceability computing system 200 and/or reports generated by the traceability computing system 200. For instance, the archive system(s) 700 can automatically backup information from the traceability computing system 200. "Backup" as it relates to the archive system(s) 700 and/or traceability computing system 200 can include any copying and/or archiving of computer data. For example, the archive system(s) can copy data stored with the traceability computing system 200 to one or more data stores integral with, or communicatively linked to, the archive system(s) 700. In one or more arrangements, the archive system(s) 700 can be configured to backup the traceability computing system 200 at a predetermined frequency. For example, the archive system(s) 700 can backup the traceability computing system 200 at predetermined time intervals (e.g., daily, weekly, monthly, etc.). In some instances, the archive system(s) 700 can backup the traceability computing system 200 irregularly or even randomly. In some instances, the archive system(s) 700 can backup the traceability computing system 200 responsive to an input or user command. The archive system(s) 700 can be local and/or remote from the traceability computing system 200. In one or more arrangements, the archive system(s) 700 can be cloud-based.

Figure 2:
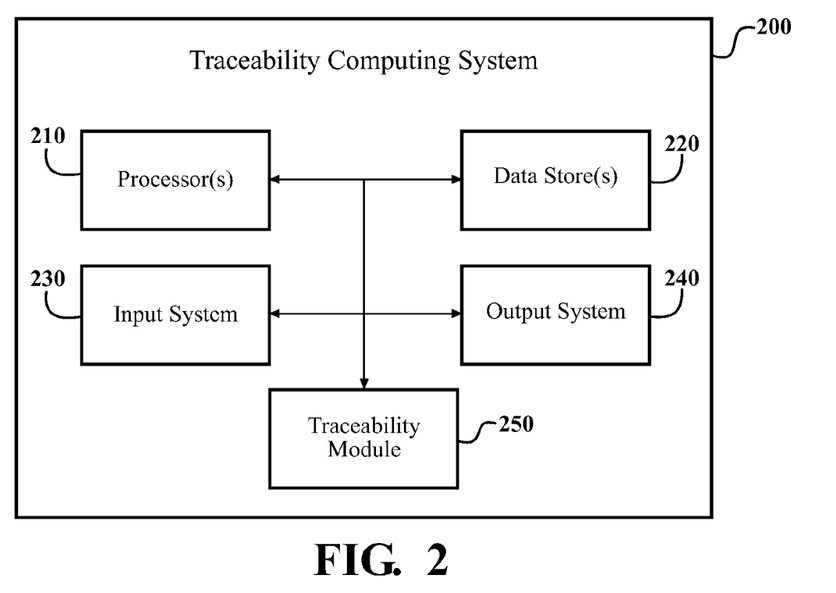
FIG. 2 is an example of a traceability computing system.

Some of the possible elements of the traceability computing system 200 are shown in FIG. 2 and will now be described. It will be understood that it is not necessary for the traceability computing system 200 to have all of the elements shown in FIG. 2. Further, the traceability computing system 200 can have additional elements to those shown in FIG. 2. Further, the elements of the traceability computing system 200, while shown together in FIG. 2, may be physically separated by large distances. It should be appreciated that although particular elements are separately defined, each or any of the elements or portions thereof may be otherwise combined or segregated via hardware and/or software.

The traceability computing system 200 can include one or more processors 210. As used herein, "processor" means one or more components that are configured to execute any of the processes described herein or any form of instructions to carry out such processes or cause such processes to be performed. The components may be disparate parts or part of a whole unit and may not necessarily be located in the same physical location. The processor(s) 210 may be implemented with one or more general-purpose and/or one or more special-purpose processors. In arrangements in which there is a plurality of processors 210, such processors 210 can work independently from each other or one or more processors can work in combination with each other.

Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor(s) 210 can include at least one hardware circuit (e.g., an integrated circuit) configured to carry out instructions contained in program code.

The traceability computing system 200 can include one or more data stores 220 for storing one or more types of data. The one or more data stores 220 can include volatile and/or non-volatile memory. Examples of suitable data stores 220 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The one or more data stores 220 can be operatively connected to the processor(s) 210 for use thereby.

The traceability computing system 200 can include an input system 230. An "input system" is any device, component, system, element or arrangement or groups thereof that enable information/data to be entered into a machine. Any suitable input system 230 can be used, including, for example, a keypad, display, touch screen, multi-touch screen, button, joystick, mouse, trackball, microphone, camera, scanner, barcode scanner, QR code scanner, and/or combinations thereof.

The traceability computing system 200 can include an output system 240. An "output system" is any device, component, system, element or arrangement or groups thereof that enable information/data to be presented. The output system 240 can present information/data to the one or more users. Any suitable output system 240 can be used. For instance, the output system 240 can be configured to provide visual and/or audial outputs. The output system 240 can include a display, a microphone, earphone, and/or speaker. Some components of traceability computing system 200 may serve as both a component of the input system 230 and a component of the output system 240.

The traceability computing system 200 can include one or more traceability modules 250. The one or more traceability modules 250 can be implemented as computer readable program code that, when executed by a processor (e.g., the one or more processors 210), implement one or more of the various processes described herein. The traceability module 250 can be a component of one or more processors, or the traceability module 250 can be executed on and/or distributed among other processing systems to which a processor is operatively connected. In one or more arrangements, the traceability module 250 can be a component of the one or more processors 210. In one or more arrangements, the traceability module 250 can be executed on and/or distributed among other processing systems to which the one or more processors 210 are operatively connected.

The traceability module 250 can include instructions (e.g., program logic) executable by a processor. Such instructions can include instructions to execute various functions, transmit data to, receive data from, interact with, and/or control one or more elements of the traceability system 100. In one or more arrangements, the traceability module 250 can include artificial or computational intelligence elements, e.g., neural network, fuzzy logic or other machine learning algorithms.

In some instances, the traceability module 250 can determine whether or not an operator should have access to the manufacturing process or a portion thereof. The determination can be performed in any suitable manner. For instance, the traceability computing system 200 can include or receive the permission settings 312. Alternatively or in addition, the traceability computing system 200 can receive the permission settings 312 from the access control system(s) 300. In one or more arrangements, the permission settings 312 can include operator authentication for one or more operators, as shown in FIG. 4 for example. In one or more arrangements, the traceability computing system 200 can receive the access request 310 from the access control system(s) 300. The access request 310 can include the operator authentication. In one or more arrangements, the traceability module 250 can be configured to determine whether the operator or supervisor identified in the access request 310 should have access to the manufacturing process. For instance, the traceability module 250 can be configured to determine whether the operator authentication is authorized based on the permission settings 312. The traceability module 250 can determine whether or not an operator should have access to the manufacturing process or a portion thereof at any suitable time. For instance, such a determination can be made at the beginning of the working shift of the operator. In some instances, the authorization to access the manufacturing process can remain in effect until the operator's shift is completed, the operator otherwise leaves the manufacturing process, or the operator otherwise checks out.

In one or more arrangements, the traceability module 250 can be configured to determine if received quality information 410 is acceptable. The quality information 410 can be the quality information acquired while the operator was granted access to the manufacturing process. In some instances, the traceability computing system 200 can receive the quality information 410 from the process quality system(s) 400. The quality information 410 can include the tool input(s) 404 and/or the manual input(s) 406. For example, the quality information 410 can include electronic data generated by one or more quality tools, such as torque wrenches, vision sensors, leak tests, scales, etc. Such electronic data can be automatically generated. The quality information 410 can further include manual data input, such as the results from visual quality checks and/or custom comments. The custom comments can be received from the process quality system(s) 400 and/or the input system 230.

The traceability module 250 can be configured to determine if the tool input(s) 404 and/or the manual input(s) 406, individually and/or collectively, are acceptable. For example, the traceability computing system 200 can have access to predetermined acceptable value or ranges for the tool input(s) 404 and/or the manual input(s) 406. The quality information 410 can be compared with the predetermined acceptable values and/or ranges to determine whether the tool input(s) 404 and/or the manual input(s) 406 are acceptable. In one or more arrangements, the traceability module 250 can be configured to determine whether quality checks performed during the manufacturing process, including one or more of the tool input(s) 404 and/or the manual input(s) 406, are acceptable. In some instances, the traceability module 250 can be configured to determine whether all quality checks are acceptable. If one or more inputs 404 and 406 in the quality information 410 are determined to not be acceptable, the traceability module 250 can be configured to send an alerts to an operator or cause an alert to be sent. For example, the traceability module 250 can send an alert or cause an alert to be sent via the output system(s) 240 of the traceability computing system 200.

In one or more arrangements, the traceability module 250 can be configured to cause the traceability computing system 200 to send identification information 510 to one or more elements of the traceability system 100. For example, the identification information 510 can be sent to the identification system(s) 500 to apply a traceable output to the part or cause a traceable output to be applied to the part. The identification information 510 can be based on the operator authentication and/or the quality information 410. Further, the identification information 510 can include the manufacturing origin, the manufacturing sequence, manufacturing shift, manufacturing date, manufacturing time, and/or a part type.

Figure 5:
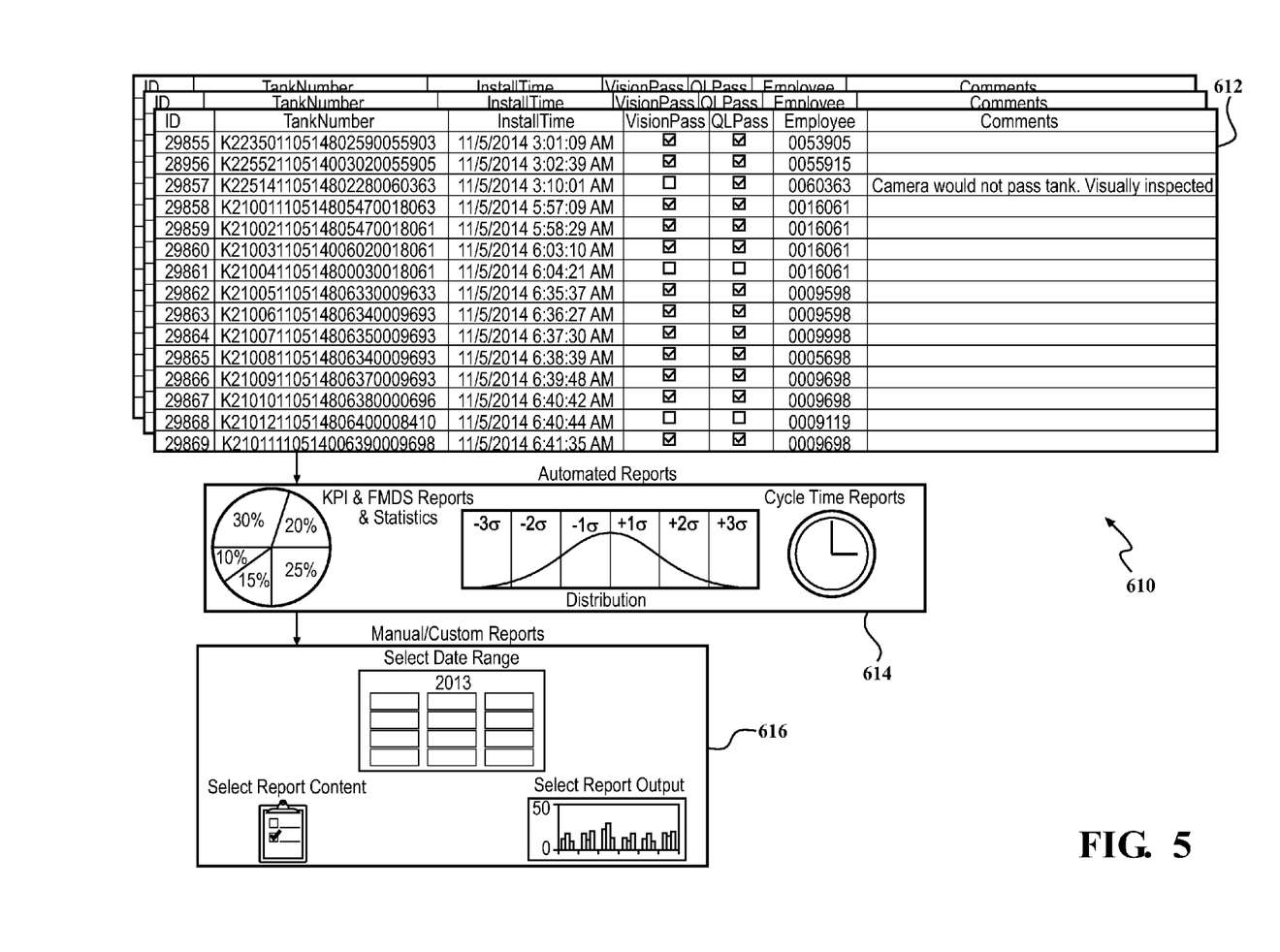
FIG. 5 shows examples of traceability reports.

In one or more arrangements, the traceability module 250 can be configured to cause the traceability computing system 200 to generate one or more traceability reports 610 (FIG. 5). The traceability reports 610 can be in any suitable form and can include any of the identification information 510 discussed above. With reference to FIG. 5, the generated traceability reports 610 can be automatically generated by the traceability computing system 200, and/or be manually requested by a user. For example, the generated traceability reports can include a traceability database 612, automatically generated reports 614, and/or manual or custom reports 616. The traceability reports 610 can have any suitable arrangement of information. As shown in FIG. 5, the traceability database 612 can include information relating to an identification number, a process time, one or more quality check results, an operator identification, and/or any comments entered during the manufacturing process. In one or more arrangements, the traceability reports 610 can include operator information, such as any of the permission settings 312, such as a first name, a last name, an employee number, full time status, a security level, and/or a Key ID for each associated operator. Thus, in some arrangements, the traceability reports 610 can include traceability back to one or more operators that access the manufacturing process.

The traceability module 250 can also provide one or more systems access to the generated traceability reports 610. The "provide access" can include any configuration in which external or remote computing systems can download, view, backup, copy, record, print, or otherwise interact with data. For example, the traceability module 250 can allow the review system(s) 600 and/or the archive system(s) 700 the ability to download, view, store, or access the generated traceability reports 610. In some arrangements, the traceability module 250 can be configured to instruct the review system(s) 600 to access data stored on the archive system(s) 700. For example, the review system(s) 600 can access traceability reports 610 stored at the traceability computing system 200 and/or the archive system(s) 700.

In some instances, the traceability module 250 can be configured to cause the traceability computing system 200 to store at least a portion of the generated traceability reports. For example, the generated traceability reports 610 can be stored in the data store(s) 220 of the traceability computing system 200 for a predetermined period of time.

In one or more arrangements, the traceability module 250 can be configured to allow the traceability computing system 200 to operate other manufacturing systems. For instance, the traceability computing system 200 can control pokayoke systems for the manufacturing process. As used herein, "pokayoke" can include any device, mechanism, and/or system that helps an operator avoid mistakes in a manufacturing process. The pokayoke systems can include controlling transportation systems (such as conveyers). For example, the traceability computing system 200 can prevent a transportation system from moving the part or assembly until the manufacturing process is complete.

In one or more arrangements, the traceability module 250 can allow the traceability computing system 200 to present information to one or more users, including an operator. For instance, the status of one or more manufacturing processes can be presented to users via visual control boards, lights, and/or audible sources. The traceability computing system 200 can be communicatively linked to an Andon system within a manufacturing facility, for example. An Andon system can be configured to notify management, maintenance, operators, and other personnel associated with a manufacturing process of a problem (process, quality, or other). In one or more arrangements, the Andon system can include a display that can present an indicators of a problem.

Figure 6:
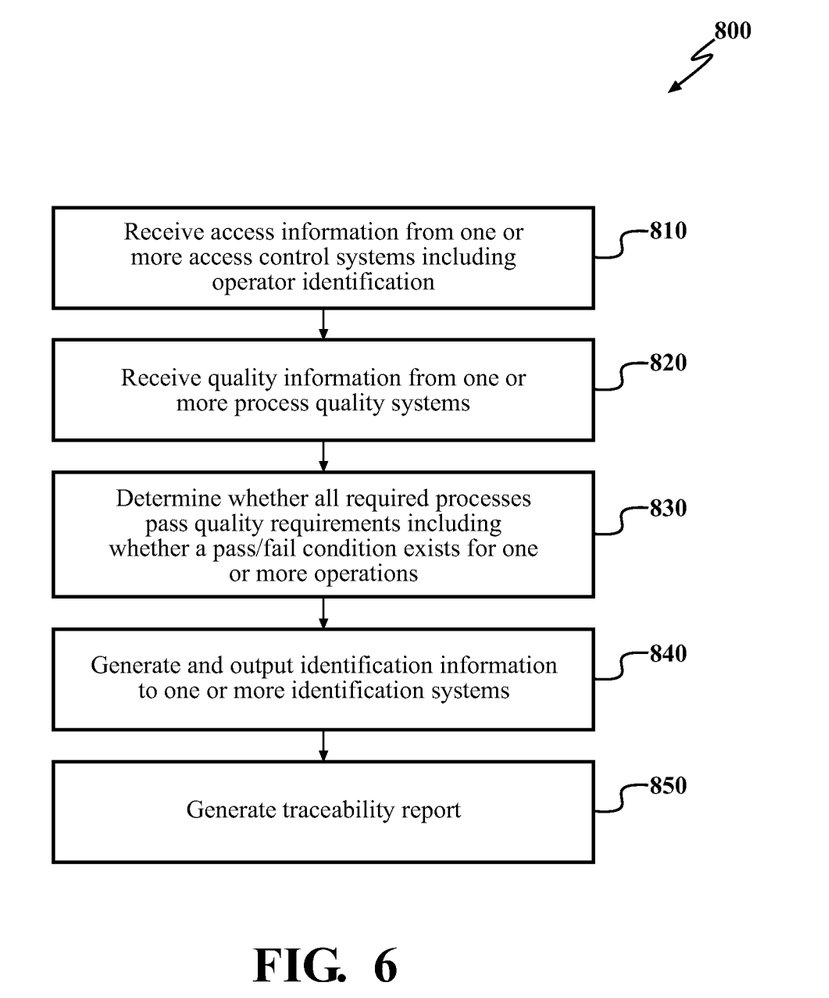
FIG. 6 is an example of a method for operator and manufacturing quality traceability.

Now that the various potential systems, devices, elements and/or components have been described, various methods for providing traceability for manufacturing processes will now be described. Referring now to FIG. 6, one example of such a method is shown. Various possible steps of method 800 will now be described. The method 800 illustrated in FIG. 6 may be applicable to the arrangements described above in relation to FIGS. 1-5, but it is understood that the method 800 can be carried out with other suitable systems and arrangements. Moreover, the method 800 may include other steps that are not shown here, and in fact, the method 800 is not limited to including every step shown in FIG. 6. The steps that are illustrated here as part of the method 800 are not limited to this particular chronological order. Indeed, some of the steps may be performed in a different order than what is shown and/or at least some of the steps shown can occur simultaneously.

At block 810, an access request 310 can be received. In one or more arrangements, the access request can be received from any suitable source, such as one or more access control systems 300. In some instances, the access request 310 can be automatically sent by one or more access control systems 300 in response to an attempt by an operator to access at least a portion of a manufacturing process. The operator may attempt to access the manufacturing process to perform and/or supervise one or more processes of the manufacturing process.

The access request 310 can include identification information for one or more operators. For example, the access request 310 can include operator authentication associated with the operator requesting access to at least a portion to perform, or supervise, one or more processes of the manufacturing process. In one or more arrangements, the access request 310 can be received by the traceability computing system 200. In one or more arrangements, permission settings 312 can be received by the traceability computing system 200. In some instances, the permission settings 312 can be received together with the access request 310. However, in other instances, the permission settings 312 and the access request 310 can be received separately.

At block 820, quality information 410 can be received. The quality information 410 can be received from any suitable source, such as, for example, from one or more process quality systems 400. The quality information 410 can include data relating to one or more quality checks performed during the manufacturing process. The quality checks can include at least those associated with the authorized operator during the manufacturing process (e.g., the quality checks actually performed by the operator and/or for which the operator supervised or is otherwise responsible). The quality checks can include at least one required quality check.

In one or more arrangements, the quality information 410 can include one or more tool inputs 404 received from one or more quality check tools. Further, the quality information 410 can include any measurements of one or more components during a manufacturing process. The quality information 410 can include data obtained automatically by the process quality system 400 and/or data input manually by an operator to either the process quality system 400 or the traceability computing system 200. In some instances, the quality information 410 can include indications of a pass and/or fail condition of the tool input(s) 404 and/or the manual input(s) 406. For example, the process quality system 400 can include a quality controller 402 configured to determine if the tool input(s) 404 and/or the manual input(s) 406 meet predetermined criteria. In one or more arrangements, the quality information 410 can be received by the traceability computing system 200.

At block 830, it can be determined whether the at least one required quality check passes one or more quality requirements. For example, the determining can be done by the processor(s) 210 of the traceability computing system 200. The determining can be based on whether one or more of the tool inputs 404 and/or one or more of the manual inputs 406 meet predetermined requirements. In one or more arrangements, the determining can be at least partially based on a set of rules to determine whether a tool input 404 and/or a manual input 406 has met quality standards. The rules can be included in the data store(s) 220 and/or traceability module 250 of the traceability computing system 200.

At block 840, responsive to determining whether the at least one required quality check passes one or more quality requirements, identification information can be generated for a particular part or assembly. In one or more arrangements, the identification information 510 can also be output. The identification information 510 can include a unique identifier for a particular component or assembly of components. The identification information 510 can be configured to allow or cause an identification system (e.g., identification system 500) to apply or cause to be applied a traceable output to the part associated with the manufacturing process. For example, the identification system can include a barcode printer, and the identification information 510 can be in the form of a barcode. In some instances, the generating and output of the identification information 510 can be performed by the traceability computing system 200.

At block 850, a traceability report can be generated. Generating the traceability report can include compiling, analyzing, comparing, and/or compiling the received access request(s) 310, the quality information 410, and/or the identification information 510. For instance, the traceability report 610 can be a traceability database 612 that can include the operator authentication, the quality information 410, and/or the identification information 510. In one or more arrangements, the traceability database 612 can be searchable and/or sortable by external computing systems. Further, the traceability reports 610 can include any automatic or manually generated reports based on the operator authentication, the quality information 410, and/or the identification information 510 of one or more parts/assemblies. In some instances, the generating of the traceability report can be done by the traceability computing system 200.

The method 800 can end. Alternatively, the method 800 can return to block 810. As a further alternative, the method 800 can include additional and/or alternative blocks (not shown).

Figure 7:
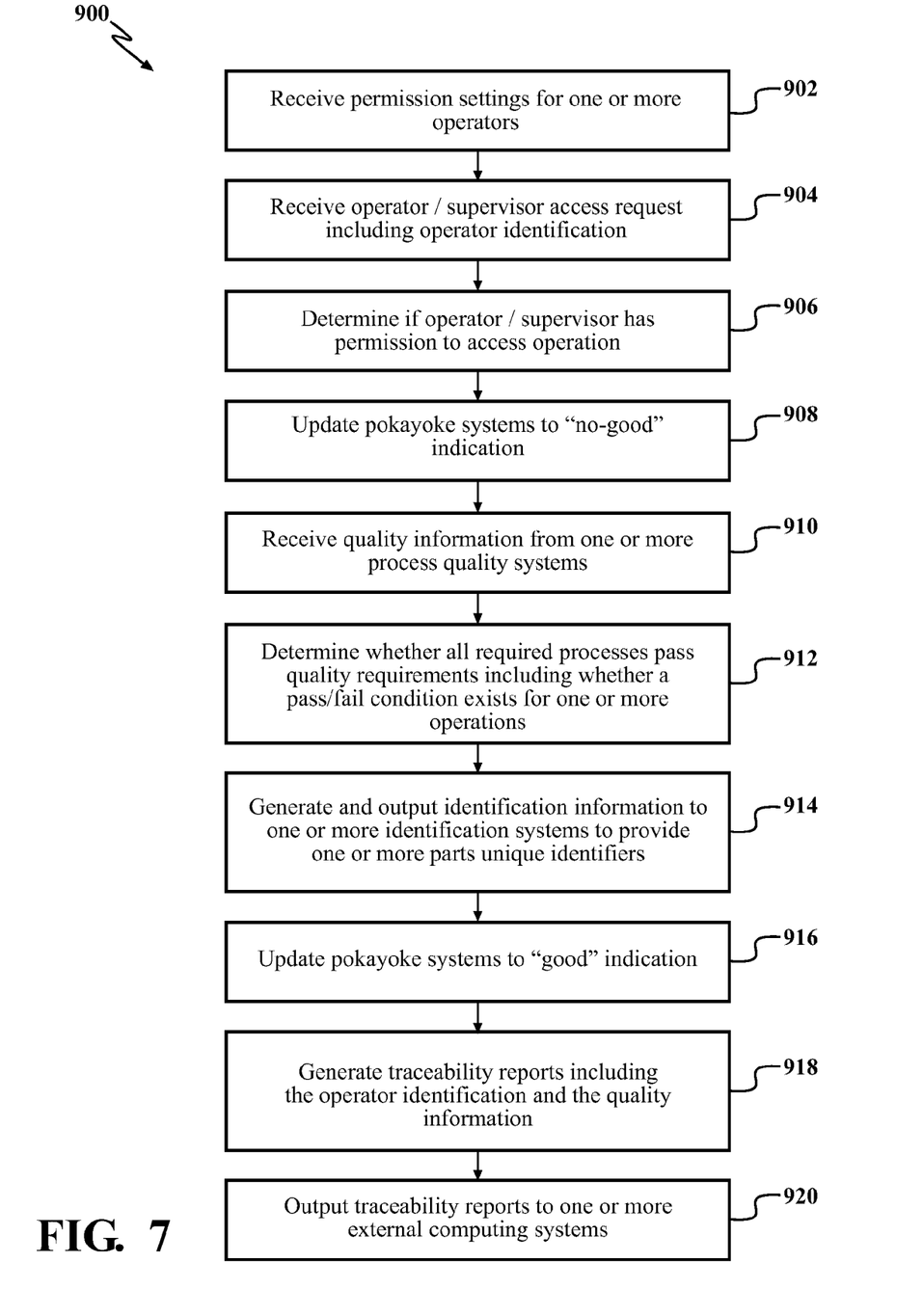
FIG. 7 is another example of a method for operator and manufacturing quality traceability.

Referring now to FIG. 7, another example of a traceability method is shown. Various possible steps of method 900 will now be described. The method 900 illustrated in FIG. 7 may be applicable to the arrangements described above in relation to FIGS. 1-5, but it is understood that the method 900 can be carried out with other suitable systems and arrangements. Moreover, the method 900 may include other steps that are not shown here, and in fact, the method 900 is not limited to including every step shown in FIG. 7. The steps that are illustrated here as part of the method 900 are not limited to this particular chronological order. Indeed, some of the steps may be performed in a different order than what is shown and/or at least some of the steps shown can occur simultaneously.

At block 902, permission settings for one or more operators can be received. The permission settings 312 can include information identifying an operator as well as a permission level for the operator. For example, the permission settings 312 can include an operator authentication and a security level for one or more operators. In some instances, the traceability computing system 200 can receive the permission settings 312. The permission settings 312 can be received at any suitable time. In one or more arrangements, the permission settings 312 can be received responsive to a receiving an access request 310. However, in one or more arrangements, the permission settings 312 can be received at a different time and/or not in response to receiving an access request 310.

At block 904, an operator and/or supervisor access request 310 can be received. The access request 310 can include, for example, an operator authentication. In some instances, the traceability computing system 200 can receive the access request from the access control system 300. The access request 310 can be received subsequent to an electronic key being presented at the access control system 300. For example, each operator can have an electronic key that includes the operator authentication. The electronic key can be read by the access control system 200 and a signal can be sent to the traceability computing system 300.

At block 906, it can be determined whether the operator identified in the access request has permission to access the manufacturing process. For example, it can be determined, by the processor(s) 210 of the traceability computing system 200, whether the operator associated with the operator authentication is authorized to access the manufacturing process based on the permission settings 312. In one or more arrangements, it can be determined what portions of the manufacturing process and/or traceability system 100 the operator should access. For example, security levels in the permission settings 312 can provide different levels of access to different operators.

At block 908, pokayoke systems can be set to a "no-good" condition. For example, the traceability computing system 200 can cause one or more systems to prevent the part or assembly from being passed to the next process. These systems can disable conveyers, enable stoppers, and/or provide visual and/or audial indications to operators. In one or more arrangements, the pokayoke system(s) can be set to a "no-good" condition at any suitable time. For instance, the pokayoke system(s) can be set to a "no-good" condition as a default condition. As another example, pokayoke system(s) can be set to a "no-good" condition responsive to receiving a new part at a station of the manufacturing process. As still another example, pokayoke system(s) can be set to a "no-good" condition upon determining that an operator is authorized to access the manufacturing process.

At block 910, quality information from one or more process quality systems can be received. The quality information 410 can include the results from one or more quality checks associated with the operator or supervisor during the manufacturing process. For example, the quality information 410 can include one or more of the tool inputs 404 and/or one or more of the manual inputs 406 received during the manufacturing process. In some instances, the quality information 410 can include pass/fail results from one or more quality tool checks. Further, the quality information 410 can include any measurements of one or more components or tools during a manufacturing process. The quality information 410 can include data obtained automatically by the process quality control system 400 and/or data inputted manually by an operator to either the process quality control system 400 or the traceability computing system 200. At least one of the quality checks can be a required quality check.

At block 912, it can be determined whether the at least one required quality check passes one or more predetermined requirements. In some instances, the predetermined requirements can be stored in the data store(s) 220 and/or traceability module 250. Further, the determining can be accomplished by the processor(s) 210.

At block 914, responsive to determining whether the predetermined quality requirements are met, identification information 510 can be generated for a part associated with the manufacturing process. The identification information 510 can also be output at block 914. The identification information 510 can include a unique identifier for the part. The identification system can be configured to apply or cause to be applied a traceable output to the part. For example, the identification system can include a barcode printer, and the identification information 510 can be in the form of a barcode. In some instances, the generating and outputting of the identification information 510 can be done by the traceability computing system 200.

At block 916, pokayoke systems can be updated to a "good" condition after determining the predetermined quality requirements have been met. For example, the stoppers can be removed and/or conveyers can be activated to transfer the part or assembly to a subsequent process. Status indications can be sent at block 916. For example, the traceability computing system 200 can output signals to one or more Andon systems. The part can be moved to the next station in the manufacturing process, or the manufacturing process may be completed. If new part is received at the station, and the pokayoke systems can be updated to a "no-good" condition.

At block 918, traceability reports can be generated. Generating the traceability report 610 can include compiling, analyzing, comparing, and/or compiling the received access request(s) 310, the quality information 410, and/or the identification information 510. For instance, the traceability report 610 can be a traceability database 612 that can include the operator authentication, the quality information 410, and/or the identification information 510. In one or more arrangements, the traceability database 612 can be searchable and/or sortable by external computing systems. Further, the traceability reports 610 can include any automatic or manually generated reports based on the operator authentication, the quality information 410, and/or the identification information 510 of one or more parts/assemblies. In some instances, the generating of the traceability report can be done by the traceability computing system 200.

At block 920, the traceability reports can be output to one or more external computing systems. For example, the traceability computing system 200 can allow the traceability reports 610 to be accessed by the review system 600 and/or the archive system 700.

The method 900 can end. Alternatively, the method 900 can return to block 902 or any other blocks within the method 900. As a further alternative, the method 900 can include additional and/or alternative blocks (not shown).

A non-limiting example of the operation of the above systems and methods will now be presented. Arrangements described herein can be used in application with a manufacturing process that is a vehicle component assembly process. For example, the vehicle component assembly process can be a fuel tank pump assembly process. The traceability computing system 200 can be configured to provide access to certain operators and supervisors, provide quality control through communication with one or more process quality system(s) 400, and allow the detailed traceability of several aspects of the manufacturing process.

An operator or supervisor may wish to access a manufacturing process or a portion thereof (e.g., a particular station). The operator or supervisor may be restricted from doing so by a physical impediment (e.g., a door, a barrier, etc.) or a portion of the manufacturing process may be disabled or withheld (e.g., a quality check tool can be disabled or can be located in a locked storage compartment). Manufacturing process operators and supervisors can be assigned electronic keys coded to identify each person and their approved permission level. The key can be presented to a key reader of the access control system 300. The key reader can be provided in any suitable location.

The key reader can detect the electronic key. In response, an access request 310 can be sent from the access control system 300 to the traceability computing system 200. Permission settings 312 can be sent by the access control system 300 and/or be stored in the traceability computing system 200. The traceability computing system 200 can determine whether the operator authentication included in the access request 310 is acceptable based on the permission settings 312. If the operator authentication is acceptable, the operator can be granted access to the pump assembly process. For example, the door can be unlocked. If the operator authentication is not acceptable, the operator can be denied access to the pump assembly process. As an example, the door can remain locked. In some instances, an alarm or warning can be generated.

The traceability computing system 200 can cause one or more pokayoke systems to be implemented prior to the pump assembly process. For example, a conveyer stopper can be engaged by the traceability computing system 200. Further, the traceability computing system 200 can be communicatively linked with any other manufacturing display systems, such as an Andon system to display the status of the manufacturing process.

At one or more stages of the manufacturing process, the process quality system(s) 400 can receive quality information from one or more quality check tools used within the fuel tank pump assembly process. For example, the process quality system 400 can receive inputs from tools such as vision sensors, torque wrenches, and/or leak tests involved with the assembly of the fuel tank pump. Additionally, inputs from manual checks can be received, such as a visual quality check, tool bypass status, or any other selectable or custom comments specific to that part, assembly, operator, and/or quality check. Quality information 410 can be sent from the process quality system(s) to the traceability computing system 200. At least one of the inputs can be a required quality check. In one or more arrangements, the quality information can be received while the operator is accessing the manufacturing process. If the operator is no longer accessing the manufacturing process, then the quality information may, in some instances, no longer be sent by the process quality system(s).

The traceability computing system 200, in response to receiving the quality information 410, can determine whether the at least one required quality check for the assembly process has been completed. Further, it can be determined whether the at least one required quality check is acceptable based on the received inputs. For example, the traceability computing system 200 can determine if the quality check tools provided a pass, fail, or bypass status.

Responsive to determining if the quality checks are completed, the traceability computing system 200 can send identification information 510 to one or more identification systems 500. The identification system(s) 500 can be configured to impart a traceable output to a part of the pump assembly. For example, the identification system(s) 500 can include a barcode printer configured to print a barcode on the part. The barcode can include any code and/or alphanumeric text that identifies one or more of a manufacturing origin, manufacturing sequence, manufacturing shift, manufacturing date, manufacturing time, part/assembly type, and/or operator identification.

The traceability computing system 200 can be configured to generate traceability reports 610. For example, the generated traceability reports can include a traceability database 612, automatically generated reports 614, and/or manual or custom reports 616. The standard reports can include a tank identifier, an install time, whether or not it pass a vision test, whether or not it passed a second quality test, one or more operator identifiers, and any comments received via manual input(s).

The traceability computing system 200 can be configured to perform the above operations for more than one manufacturing process. For example, subsequent to the completion of one manufacturing process, the part/assembly can be transferred to other manufacturing processes. The traceability computing system 200 can receive an access request 310 and/or quality information 410 for the additional manufacturing process. Further, identification information 510 can be sent to an identification system 500 to apply another traceable output to the part/assembly. The traceability computing system 200 can generate separate traceability reports for the subsequent manufacturing processes. Alternatively or in addition, the traceability computing system 200 can add traceability information from subsequent manufacturing processes to previously-generated traceability reports. For instance, the traceability database 612 can have additional quality test results added.

The traceability reports 610 can be sent or otherwise made available to other computing systems for review. For example, one or more review systems 600 can access the traceability database 612. The review system(s) 600 can include any computer or electronic data storage device communicatively linked with the traceability database 612. The traceability database 612 can be searched, sorted, and categorized. The review system(s) 600 can identify any manufactured part or assembly by any attribute included in the identification information 510. Further, the review system(s) 600 can cause automatic or manual reports 614 and 616 to be generated. These reports can identify performance metrics, including quality control charts and/or trends, statistical process control trends, process capability charts and/or trends, cycle time charts, product mix (heijunka), skipped processes or other warnings/alarms, suspect defect ranges based on any attribute included in the identification information 510, plant of origin trends by shift, date, time, and/or operator, active and inactive operators, and/or operator and supervisor permission levels.

The traceability reports 610, including the traceability database 612 and automatic and manually generated reports 614 and 616, can be backed up to one or more archive system(s) 700. The information can be saved at a selectable time frequency.

The traceability reports 610 can be used to provide useful information when the part is installed on a larger assembly or vehicle. For example, the barcode(s) or other traceable output(s) on the assembly can be scanned or entered into a completed vehicle database. For example, the identification information 510 can be associated with a vehicle identification number (VIN), to allow attributes of the specific part (e.g., the fuel tank) can be analyzed on a vehicle level, even after the vehicle is produced and in the consumer field. Thus, arrangements described herein can allow relevant information to be consolidated and accessed after a part has left a manufacturing process.

It will be appreciated that arrangements described herein can provide numerous benefits, including one or more of the benefits mentioned herein. For example, arrangements described herein can provide operator access control of a manufacturing process. The traceability system can receive access requests and can determine if the identified operator should have access to the manufacturing process, thereby providing exclusive access control and helping to ensure that the manufacturing process is only accessed by authorized personnel. Further, the traceability system can provide different types of access to the manufacturing process and/or databases based on security levels associated with each operator. Arrangements can record the identification of operator(s) associated with the manufacturing process. Further, arrangements described herein can receive quality information from one or more process quality systems. Arrangements described herein can allow a traceable output to be applied on a part or assembly that includes operator identification and/or quality information. In these ways, arrangements described herein can help to facilitate accountability of operators associated with the manufacturing process.

Arrangements described herein can generate traceability reports, including databases that can be searched, sorted, and/or categorized. The traceability reports can allow any of the identification information to be identified. Further, automatic and/or manual reports can be generated to identify key performance indicators and/or quality control trends. Arrangements described herein can be flexible and easily adaptable and scalable to multiple and diverse manufacturing processes and machines. Systems can be easily integrated with existing process Andon systems. Arrangements can be implemented in open-source software, can be integrated with multiple native process controllers, programmable logic controllers, and human machine interface equipment from any manufacturer.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A traceability computing system for operator and manufacturing quality traceability for a manufacturing process, the system comprising:
   one or more processors; and
   a memory communicably coupled to the one or more processors and storing:
   a first traceability module including instructions that when executed by the one or more processors cause the one or more processors to receive an access request from an access control system to access the manufacturing process, the access request including operator authentication associated with an operator, to receive one or more permission settings from an access control system, to establish authorization for the access request by applying the one or more permission settings to the operator authentication, to receive, in response to establishing that the operator authentication is authorized, quality information from a process quality system, the quality information including operator inputs from one or more quality checks during the manufacturing process, the one or more quality checks being associated with an operator and including at least one required quality check;
   a second traceability module including instructions that when executed by the one or more processors cause the one or more processors to compare the quality information with one or more quality standards rules to determine whether the at least one required quality check passes one or more predetermined requirements, and to generate, in response to determining that the at least one required quality check passes the one or more predetermined requirements, identification information for a part associated with the manufacturing process; and
   a third traceability module including instructions that when executed by the one or more processors cause the one or more processors to send the identification information to an identification system for application of a traceable output on the part associated with the manufacturing process, and to generate a traceability report, the traceability report including the operator authentication and the quality information.

2. The traceability computing system of claim 1, wherein the first traceability module further comprises instructions to:
   set one or more pokayoke systems to a "no-good" condition prior to receiving the quality information; and
   set the one or more pokayoke systems to a "good" condition if it is determined that the at least one required quality check passes the predetermined requirements.

3. The traceability computing system of claim 1, wherein the determining whether the operator authentication is authorized to access the manufacturing process is based on a set of permission settings.

4. The traceability computing system of claim 3, wherein the first traceability module further comprises instructions to receive the permission settings from the access control system.

5. The traceability computing system of claim 1, wherein the third traceability module further comprises instructions to provide access to the traceability report to one or more remote computing systems.

6. The traceability computing system of claim 5, wherein the traceability report is searchable based on the operator authentication.

7. The traceability computing system of claim 1, wherein the third traceability module further comprises instructions to provide access to the traceability report to one or more archive systems, and to allow the one or more archive systems to retain data from the traceability report for a predetermined period of time.

8. The traceability computing system of claim 1, wherein the identification information is in the form of a barcode or a QR code.

9. The traceability computing system of claim 1, wherein the third traceability module further comprises instructions to cause at least one of the quality information and the operator authentication to be displayed on an Andon system.

10. A non-transitory computer-readable medium for operator and manufacturing quality traceability for a manufacturing process and storing instructions that when executed by one or more processors cause the one or more processors to:
    receive an access request from an access control system to access the manufacturing process, the access request including operator authentication associated with an operator;
    receive one or more permission settings from an access control system;
    establish authorization for the access request by applying the one or more permission settings to the operator authentication;
    receive, in response to establishing that the operator authentication is authorized, quality information from a process quality system, the quality information including operator inputs from one or more quality checks during the manufacturing process, the one or more quality checks being associated with an operator and including at least one required quality check;
    compare the quality information with one or more quality standards rules to determine whether the at least one required quality check passes one or more predetermined requirements;
    generate, in response to determining that the at least one required quality check passes the one or more predetermined requirements, identification information for a part associated with the manufacturing process;
    send the identification information to an identification system for application of a traceable output on the part associated with the manufacturing process; and
    generate a traceability report, the traceability report including the operator authentication and the quality information.

11. The non-transitory computer-readable medium of claim 10, further comprising instructions to:
    set one or more pokayoke systems to a "no-good" condition prior to receiving the quality information; and set the one or more pokayoke systems to a "good" condition if it is determined that the at least one required quality check passes the predetermined requirements.

12. The non-transitory computer-readable medium of claim 10, wherein the determining whether the operator authentication is authorized to access the manufacturing process is based on a set of permission settings.

13. The non-transitory computer-readable medium of claim 12, further comprising instructions to receive the permission settings from the access control system.

14. The non-transitory computer-readable medium of claim 10, further comprising instructions to provide access to the traceability report to one or more remote computing systems.

15. The non-transitory computer-readable medium of claim 14, wherein the traceability report is searchable based on the operator authentication.

16. The non-transitory computer-readable medium of claim 10, further comprising instructions to provide access to the traceability report to one or more archive systems, and to allow the one or more archive systems to retain data from the traceability report for a predetermined period of time.

17. The non-transitory computer-readable medium of claim 10, wherein the identification information is in the form of a barcode or a QR code.

18. The non-transitory computer-readable medium of claim 10, further comprising instructions to cause at least one of the quality information and the operator authentication to be displayed on an Andon system.

19. A traceability computing system for operator and manufacturing quality traceability for a manufacturing process, the system comprising:
one or more processors; and
a memory communicably coupled to the one or more processors and storing:
a first traceability module including instructions that when executed by the one or more processors cause the one or more processors to generate an interface, the interface receiving permission settings including a list of operator authentications and associated security levels, to receive an access request from an access control system, the access request including an operator authentication associated with an operator, to receive one or more permission settings from an access control system, to establish authorization for the access request by applying the one or more permission settings to the operator authentication, and to output a signal indicative of a no-good condition to a pokayoke system;
a second traceability module including instructions that when executed by the one or more processors cause the one or more processors to receive, in response to determining that the operator associated with the operator authentication is authorized, quality information from a process quality system, the quality information including operator inputs from one or more quality checks during the manufacturing process, the one or more quality checks being associated with an operator and including at least one required quality check, to compare the quality information with one or more quality standards rules to determine whether all required quality checks pass predetermined requirements, and to generate, in response to determining that all required quality checks pass the predetermined requirements, identification information for a part associated with the manufacturing process; and
a third traceability module including instructions that when executed by the one or more processors cause the one or more processors to cause a traceable output to be applied to the part associated with the manufacturing process, the traceable output including the identification information, to output a signal indicative of a good condition to the pokayoke system, to generate a traceability report, the traceability report including the operator authentication and the quality information, and to output the traceability report to one or more external computing systems.

20. The traceability computing system of claim 19, wherein the outputting a signal indicative of a good condition to a pokayoke system is responsive to causing the traceable output to be applied to the part associated with the manufacturing process.

* * * * *